UNITED STATES PATENT OFFICE.

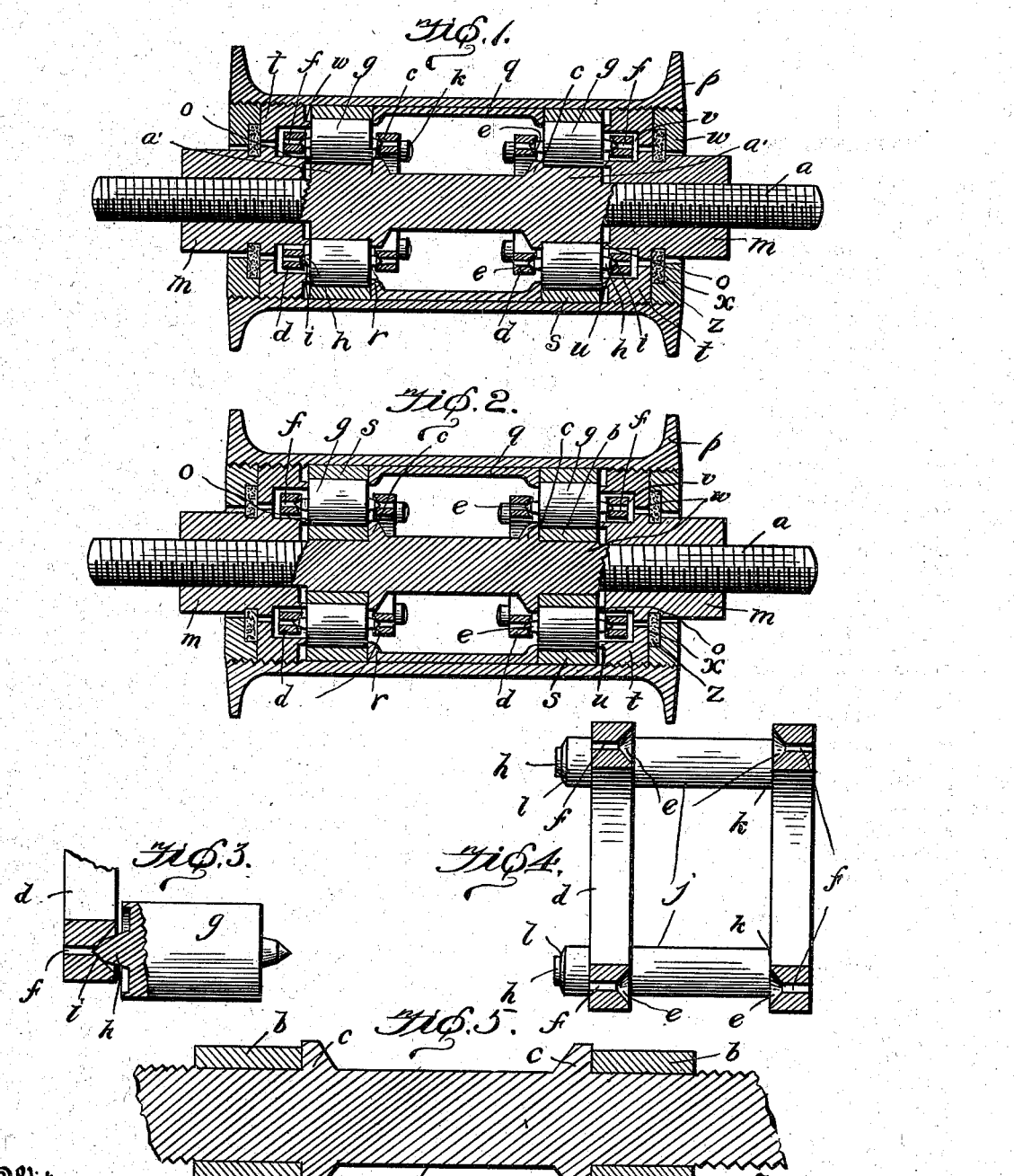

ALBERT ENNIS HENDERSON, OF TORONTO, CANADA, ASSIGNOR TO THE TORONTO ROLLER BEARING COMPANY, LIMITED, OF TORONTO, CANADA, A CORPORATION OF ONTARIO.

ROLLER-BEARING.

SPECIFICATION forming part of Letters Patent No. 709,441, dated September 16, 1902.

Original application filed July 20, 1901, Serial No. 69,151. Divided and this application filed June 5, 1902. Serial No. 110,334. (No model.)

*To all whom it may concern:*

Be it known that I, ALBERT ENNIS HENDERSON, a subject of the King of Great Britain, residing at Toronto, in the county of York, Province of Ontario, and Dominion of Canada, have invented certain new and useful Improvements in Roller-Bearings, of which the following is a specification.

This invention relates to improvements in roller-bearings, and is a divisional application of my application for Letters Patent upon roller-bearings filed July 20, 1901, Serial No. 69,151.

This invention relates to an antifriction roller-bearing for rotatable shafts mounted in stationary journal-boxes or for a wheel rotatably mounted on a stationary shaft or axle; and the object of the invention is to so construct a bearing that there will be practically no friction between the journal and the antifriction-rollers when the parts are in motion and also to provide a means for adjusting the parts relatively to each other to prevent longitudinal, radial, and lateral displacement.

In the drawings, Figure 1 is a sectional view of the roller-bearing, showing the relative position of the parts. Fig. 2 is a sectional view of a modification. Fig. 3 is an enlarged view of one of the antifriction-rollers. Fig. 4 is an enlarged sectional view through one of the bearing or retaining rings. Fig. 5 is an enlarged sectional view of the axle and sleeve shown in Fig. 2.

Like letters of reference refer to like parts through the specification and drawings.

In Fig. 2 the axle $a$ is shown to be fitted with sleeves or boxings $b$, prevented from inward displacement by abutting flanges $c$, integrally formed with the axle $a$ at the inner ends of the seats therefor and abutting and projecting slightly beyond the periphery of the sleeves or boxings $b$. Encircling the axle $a$ are two sets of bearing or retaining rings $d$, in the inner faces of which are formed conical recesses $e$, terminating in horizontally-disposed openings or bores $f$, parallel with the axis of the shaft or axle $a$. Contained between the bearing or retaining rings are antifriction-rollers $g$, having tapering mandrels $h$, terminating abruptly in conical-shaped ends $i$. When the antifriction-rollers and the bearing or retaining rings are assembled, the conical-shaped ends $i$ are contained in the recesses $e$, the points of the ends $i$ being opposed to the bores $f$, so that the contact between the ends of the mandrels and the rings will not be upon the points of the mandrels, but as near thereto as will render the contact substantial, and as the recesses $e$ are of much greater diameters than the ends of the mandrels it follows that there will be no contact other than that near the points. Uniting retaining or bearing rings are tie-rods $j$, having shoulders $k$ engaging the inner faces of the retaining-rings and the usual screw-threaded shanks, which pass through the rings and are fitted with nuts $l$, engaging the outer faces of the rings. By means of the tie-rods and the engaging shoulders or nuts the rings are held in such relation to each other that the conical recesses will be in horizontal opposition and the antifriction-rollers will be free from contact with each other and with the tie-rods. The axle $a$ between the sleeves or boxings $b$ and the ends is screw-threaded, and mounted on the screw-threaded parts are nuts $m$, the inner faces of which are recessed to provide outwardly-projecting flanges $o$ to contact with the ends of the roller $g$.

By reference to the drawings it will be noticed that the ends of the rollers $g$ are correspondingly recessed. The object of this construction is to minimize the contacting surfaces thereof with those of the nuts $m$. The abutting flanges $c$ engaging the inner ends and the nuts $m$ engaging the outer ends of the rollers hold the rollers in an adjusted position on the sleeves or boxings $b$. Inclosing the rollers $g$ and the retaining-rings $d$ is the shell $p$ of the hub, the inner faces of the ends of which are screw-threaded, and contained in the hub-shell $p$ is a centrally-located lining $q$, having annular abutting flanges $r$, the side faces of which are disposed in the same planes as the side faces of the abutting flanges $c$, the purpose of the flanges $r$ being to assist the flanges $c$ in resisting the inward displacement of the rollers, the rollers contacting with the adjusting-nuts and preventing the outward displacement of the hub-shell. Contained within the hub-sehll are antifriction-linings s, opposed to the antifriction sleeves or boxings b. The antifriction-rollers g engage the sleeves b and linings s during the rotation of the wheel or axle and revolve collectively with the bearing or retaining rings about the shaft or axle, each antifriction-roller during such collective revolution revolving individually on its own axis. Contained in the threaded ends of the hub-shell p are annular nuts t, the inner faces of which are fitted with annular flanges u, bearing against the outer ends of the antifriction-rollers g. When assembled in position, the nuts t are alined with the nuts m, and formed in the nuts m and t are annular recesses v, in which are contained the adjacent rings d, there being sufficient clearance between the rings and nuts to prevent any contact between them. Fitted in the ends of the hub or sleeve p are lock-nuts w, bearing against the nuts t, and formed in the nuts w and t are annular recesses x, in which are contained washers z. Instead of using the sleeves or boxings the axle may be fitted with enlargements a', as shown in Fig. 1, with which engage the antifriction-rollers g.

Having thus described my invention, what I desire to secure by Letters Patent is—

1. In a roller-bearing, the combination of an external hub-shell having internal annular flanges, an axle having integral peripheral flanges alining substantially with the annular flanges of the hub-shell, bearing-rings having conical recesses terminating in horizontally-disposed bores, tie-rods having abutting shoulders engaging the inner faces and nuts engaging the outer faces of the bearing-rings, bearing-rollers having tapering mandrels terminating in abruptly-conical ends journaled in the conical recesses, antifriction-sleeves contained within the hub-shell encircling and contacting the bearing-rollers, and antifriction-sleeves mounted on the axle encircled by and contacting the rollers.

2. The combination of the hub-shell having internal annular flanges, an axle having integral peripheral flanges alining substantially with the annular flanges of the hub-shell, bearing-rings having conical recesses terminating in horizontally-disposed bores, tie-rods having abutting shoulders engaging the inner faces and nuts engaging the outer faces of the bearing-rings, bearing-rollers having tapering mandrels terminating in abruptly-conical ends journaled in the conical recesses, and antifriction bearing-surfaces for the rollers.

3. The combination of the hub-shell having internal annular flanges, an axle having integral peripheral flanges alining substantially with the annular flange of the hub-shell, bearing-rings having conical recesses terminating in horizontally-disposed bores, tie-rods for uniting the bearing-rings, bearing-rollers having recessed ends fitted with tapering mandrels terminating in abruptly-conical ends journaled in the conical recesses, antifriction-sleeves contained within the hub-shell encircling and contacting the antifriction bearing-rollers, and nuts fitted on the axle and into the ends of the hub-shell having on their inner faces annular flanges contacting with the ends of the bearing-rollers.

4. The combination of a hub-shell having internal annular flanges, an axle having integral peripheral flanges alining substantially with the flanges of the hub-shell, bearing-rings having conical recesses terminating in horizontally-disposed bores, tie-rods having abutting shoulders engaging the inner faces and nuts engaging the outer faces of the bearing-rings, bearing-rollers having recessed ends fitted with tapering mandrels terminating in abruptly-conical ends journaled in the conical recesses, antifriction-sleeves contained within the hub-shell encircling and contacting the bearing-rollers, antifriction-sleeves mounted on the axle encircled by and contacting the bearing-rollers, nuts fitted on the axle and into the ends of the hub-shell having on their inner faces annular flanges contacting the ends of the bearing-rollers.

5. The combination of the hub-shell having internal annular flanges, an axle having integral peripheral flanges alining substantially with the flanges of the hub-shell, bearing-rings having conical recesses terminating in horizontally-disposed bores, tie-rods uniting the bearing-rings, bearing-rollers having recessed ends fitted with tapering mandrels terminating in abruptly-conical ends journaled in the conical recesses, antifriction-sleeves contained within the hub-shell encircling and contacting the bearing-rollers, antifriction-sleeves mounted on the axle and encircled by and contacting the bearing-rollers, and nuts fitted on the axle and into the ends of the hub-shell having on their inner faces annular flanges contacting with the ends of the bearing-rollers.

In testimony whereof I affix my signature in presence of two witnesses.

ALBERT ENNIS HENDERSON.

Witnesses:
DAVID P. MOORE,
T. BLAIR SHOEMAKER.